United States Patent [19]

Dean et al.

[11] Patent Number: 4,575,028
[45] Date of Patent: Mar. 11, 1986

[54] CARGO CARRYING HELICOPTERS

[75] Inventors: Edward H. Dean; Burnley R. Doxey, both of Newport News, Va.

[73] Assignee: The United States of America as represented by the Secretary of the Army, Washington, D.C.

[21] Appl. No.: 625,749

[22] Filed: Jun. 28, 1984

[51] Int. Cl.[4] .............................................. B64D 1/22
[52] U.S. Cl. ................................................ 244/137 A
[58] Field of Search ....................... 244/137 R, 137 A; 182/5, 70, 74, 190

[56] References Cited

U.S. PATENT DOCUMENTS 1,300,870 4/1919 Plush ........................................ 182/70
3,664,457 5/1972 York ........................................ 182/70

FOREIGN PATENT DOCUMENTS 663462 5/1965 Belgium ........................... 244/137 R
672525 3/1939 Fed. Rep. of Germany ... 244/137 R Primary Examiner—Trygve M. Blix
Assistant Examiner—Rodney Corl
Attorney, Agent, or Firm—Anthony T. Lane; Robert P. Gibson; Norman L. Wilson, Jr.

[57] ABSTRACT

One of the advantages of helicopters is their ability to lift significant loads to extraordinary heights. They do so with the use of various hoisting means that can initially raise the load from the ground, before the helicopter undertakes some movement to the desired location for reimplacement of its carried load. Since cargo retrieving, including carrying, lines cannot dangle dangerously when not attached to a load winch-type hoists are generally employed. There are however certain disadvantages in the conventional mechanisms that render the usage of such hoists somewhat deficient, and even hazardous in certain applications. In addition, some operations require rapid pick-up of cargo or personnel within time constraints impossible for winch mechanisms. The helicopter herein carries cargo retrieving lines by means attached to the underside thereof, adapted to be rapidly lowered therefrom to retrieve cargo and capable of deployment.

4 Claims, 5 Drawing Figures

CARGO CARRYING HELICOPTERS

BACKGROUND OF THE INVENTION

This invention broadly relates to helicopters and similar aircraft which carry cargo externally. In a specific aspect the invention pertains to helicopters deploying cargo retrieving lines.

Over the past two decades the helicopter has become significantly important in both its military and commercial applications. Generally, one main advantage that has enhanced the utility of this craft has been its ability to lift significant loads to extraordinary heights, and does so with the use of various hoisting means that can initially raise the load from the ground, before the helicopter undertakes some movement to the desired location for reimplacement of its carried load.

Since cargo retrieving, including carrying, lines cannot dangle dangerously when not attached to a load, winch-type hoists such as that shown in U.S. Pat. No. 4,244,561 are employed. While hoists have become significantly important in both military and commercial application, there are certain deficienies in the conventional mechanisms that render the usage of structured hoists somewhat deficient, and in many instances, even hazardous in certain applications. For example, most of the hoisting means available in the prior art include a winch having a single cable pay-out. The cable release is achieved by means of a supporting drum, which automatically translates a slight shifting momentum to the load itself, in many instances even before it is raised off the ground or other supporting structure. As a result, there is a tendency for the load being lifted by the helicopter to sway upon its release of contact with the ground. This can be extremely hazardous to surrounding workers or property.

Even more important, there are some operations which require rapid pick-up of cargo or personnel within time constraints impossible for winch mechanisms to meet. If a clutch were released, permitting cargo retrieving line free fall, the cargo nook would necessarily have to be so heavy as to unwind the line within the winch. Such heavy cargo hooks are not practical for use in rapidly executed operations. In addition, where several rapidly deployed lines are desired, a winch mechanism will not suffice. The invention herein has an object the improvement of cargo retrieving line dispensing helicopters to permit rapid deployment of several cargo lines in extremely short cargo retrieving time spans.

SUMMARY OF THE INVENTION

This invention is concerned with a helicopter having a cargo retrieving line carried by means attached to the underside thereof, adapted to be lowered therefrom to retrieve cargo. The cargo retrieving line is equipped with a cargo hook at its lowering end for attachment to cargo. Normally such cargo retrieving lines cannot be rapidly deployed. A plurality of cargo retrieving lines are provided herein capable for rapid deployment. The invention comtemplates the combination of a cargo line housing with a cargo line bin and a cargo hook spring carabiner. A cargo line housing, in the form of a box, is secured at its top to the helicopter at its cargo hook attachment point. Door means in the cargo line housing spring bias a door in the bottom of the housing to an open position. Latch means are included, adapted to hold the door closed against said bias. A cargo retrieving line bracket within said cargo line housing, is attached to the helicopter along with the housing.

Means are provided for securing one end of the cargo retrieving lines to the bracket. Cable release means open the cargo line housing door to jettison the cargo retrieving lines. In combination with the housing is a cargo retrieving line bin conforming in shape with the cargo line housing. Since the door is in the housing bottom the cargo lines are loaded into this bin, which is then inserted in the housing. In addition, a spring carabiner passes through all of the cargo hooks.

DETAILED DESCRIPTION OF THE INVENTION

This invention can, perhaps, be better understood from a consideration of a preferred embodiment described in conjunction with the accompanying drawings.

IN THE DRAWINGS

Figure 1:
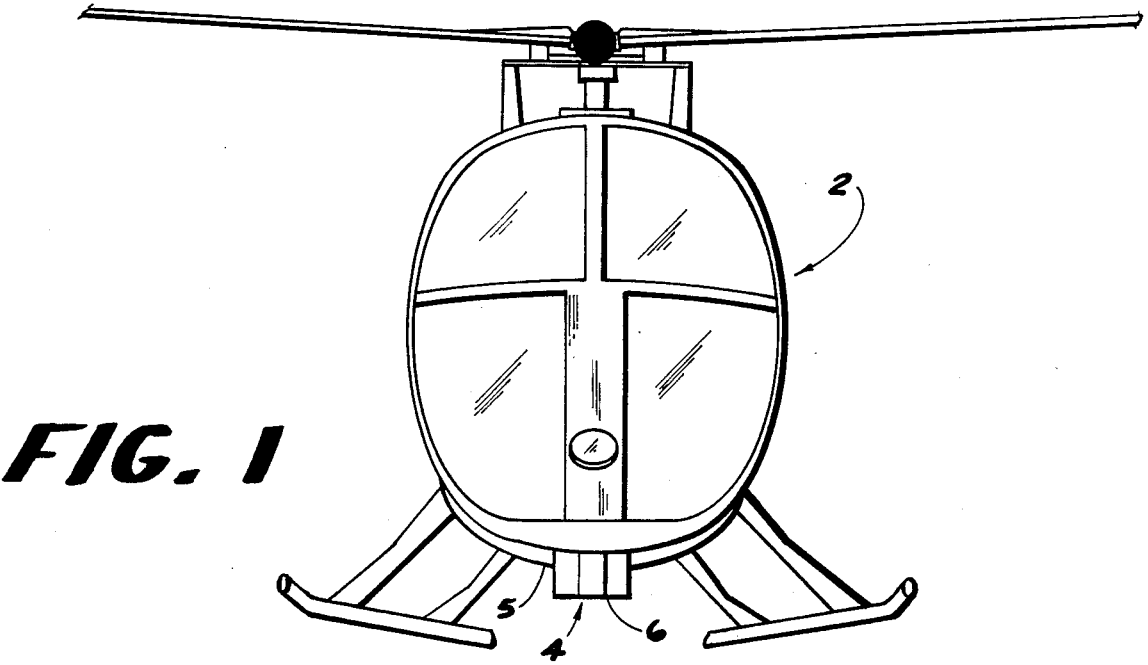
FIG. 1 is a front view of a helicopter, in chain dotted outline only, fitted with the cargo line mechanism of the invention.

As indicated previously, most cargo is carried by helicopters by means of external retrieving lines. The external lines herein are carried beneath the helicopter as shown in FIG. 1. It will be noted that helicopter 2 shown in FIG. 1 is not a heavy lift helicopter but rather a faster, observation helicopter, more likely to require a rapidly deployable load retrieving apparatus 4, the housing 6 of which is attached to the underside 5 of helicopter 2. The apparatus is mounted at the cargo hook attachment point of a helicopter so that a plurality of ropes or cargo retrieving lines can be deployed from a hover, at the pilot's discretion, in order to pick up cargo. Once deployed the ropes cannot be released in flight, since this is not the purpose to which the invention is directed.

Figure 2:
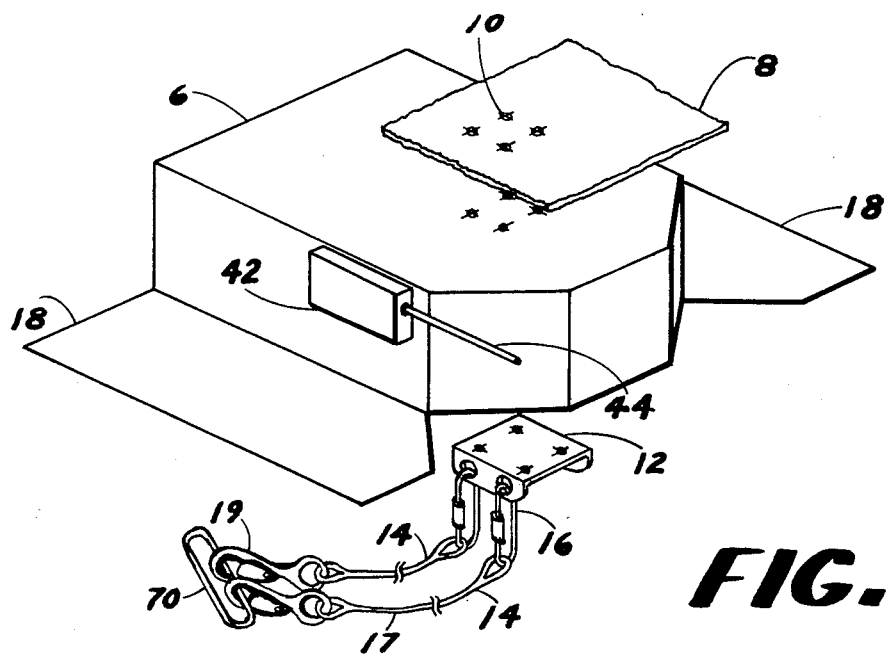
FIG. 2 is an isometric view showing the cargo line housing, fittings, and cargo retrieving lines.

Housing 6 is shown in greater detail in FIG. 2. In FIG. 2, 8 represents the fuselage lower skin surface with cargo hook attachment bolt holes 10. Housing 6 is attached to the cargo attachment plate by means of 4 bolts and locking wires not shown. The cargo lines housing is basically rectangular in plan view with the leading edge corners truncated to clear the aircraft fuel sample drain. The housing can be fabricated from any metal or plastic having a strength suitable for such use. The housing dimensions and weight will be dependent on the particular helicopter to which the housing is attached. The bolts also pass through a cargo retrieving line bracket or fitting 12 to which retrieving lines 14 are attached, preferably by means of safety snap hooks 16. Fitting 12 will normally be machined from a strong metal such as steel, preferably chrome molybdenum steel, which as been heat treated. Fitting 12 is in the shape of an inverted "U" and has a wall thickness providing sufficient strength for the intended cargo. The fitting is bolted at the cargo hook attachment point of the aircraft and safety wired. The entire cargo load is thus supported by this metal fitting.

Cargo retrieving lines 14 desirably are 75 to 150 foot ropes 3/16 to ½ inch in diameter, containing a Kevlar core and an outer protective layer of nylon braid. The top ends of the retrieving lines are spliced around ¼ inch thimbles. The safety snap hooks 16 are passed through these thimbles in order to attach the cargo retrieving lines to Fitting 12. The bottom ends of the retrieving lines are spliced at 17 directly onto standard repelling hooks 19. These repelling hooks can then be attached directly to the cargo. Whereas various means are available for attaching the cargo retrieving lines to fitting 12 safety snap hooks 16 are preferred because the screw-down feature of the hook prevents inadvertent hook release due to line entanglement.

Figure 3:
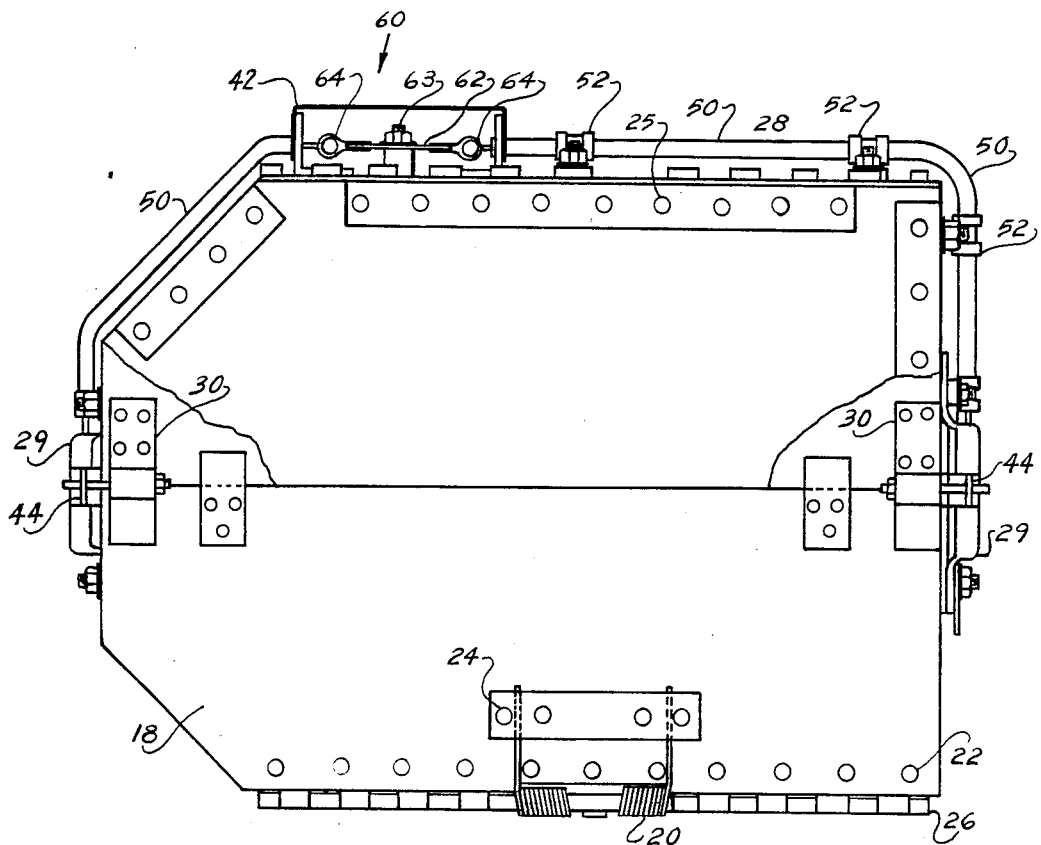
FIG. 3 is a bottom view showing the doors and the door release mechanism.

It will be noted, referring to FIG. 2, that doors 18 of cargo line housing 6 are shown in the open position. As can be seen in FIG. 3 the doors are riveted or bolted at 22, 24 and 25 to housing 6 through hinge assemblies 26 and 28. By springs 20 shown in FIG. 4 the doors are biased to an open position. A latching mechanism including latch means 30 shown in FIG. 4 secures the doors when sufficient pressure is used to close them. As shown in FIG. 3 two such bar latches 30 are employed, one at each end of the cargo line housing. Both latch bars are on the same door, which overlaps the adjacent door.

Figure 4:
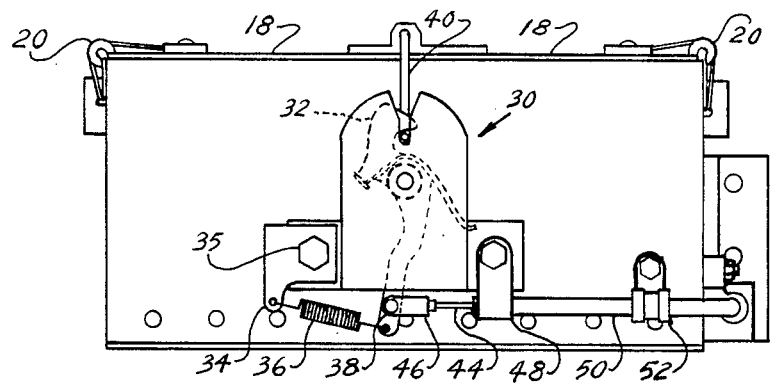
FIG. 4 is an end view in the inverted position showing the door latch mechanism.

For latching mechanism details we refer to FIG. 4. The latch mechanism 30 includes latch 32 and spring plate 34 held in place by bolt 35. Spring 36 and pin 38 bias the latch 32 to a normally closed position. To lock the doors the biased latch 32 engages a bar connected between arms 40. In other words, 40 can be a U-bolt or similar element the base of which is engaged by latch 32 to hold doors 18 closed.

It remains to describe the opening of the cargo retrieving line housing of the invention. For this purpose a cable release mechanism shown in FIG. 2 and in detail in FIG. 3, is provided within cover 42. Cable release line 44 is attached to end fitting 46 pivotally connected to latch 32. Cable release line 44 passes through clamp tubes 48, tubing 50, and spacers 52 to bell crank mechanism 60 beneath cover 42 (see FIG. 3). Bell crank 60 includes crank arm 62 pivotable about bolt 63, and cable end fittings 64. Pivoting of crank arm 62 pulls cable release lines 44 and latches 32.

It may be thought that as thus far described the cargo retrieving line apparatus is subject to certain disadvantages. There is a possibility of cargo retrieving line entanglement as the lines are jettisoned. And it would be quite difficult, considering that the lines would have to be stuffed into a housing with a door in its bottom, to pack the cargo retrieving lines. Hence in combination with the apparatus characterized is a carabiner 70, as well as a cargo line bin 72. The carabiner 70 passes through all of the repelling hooks 19 which is jettisoned when the cargo retrieving lines are deployed.

Figure 5:
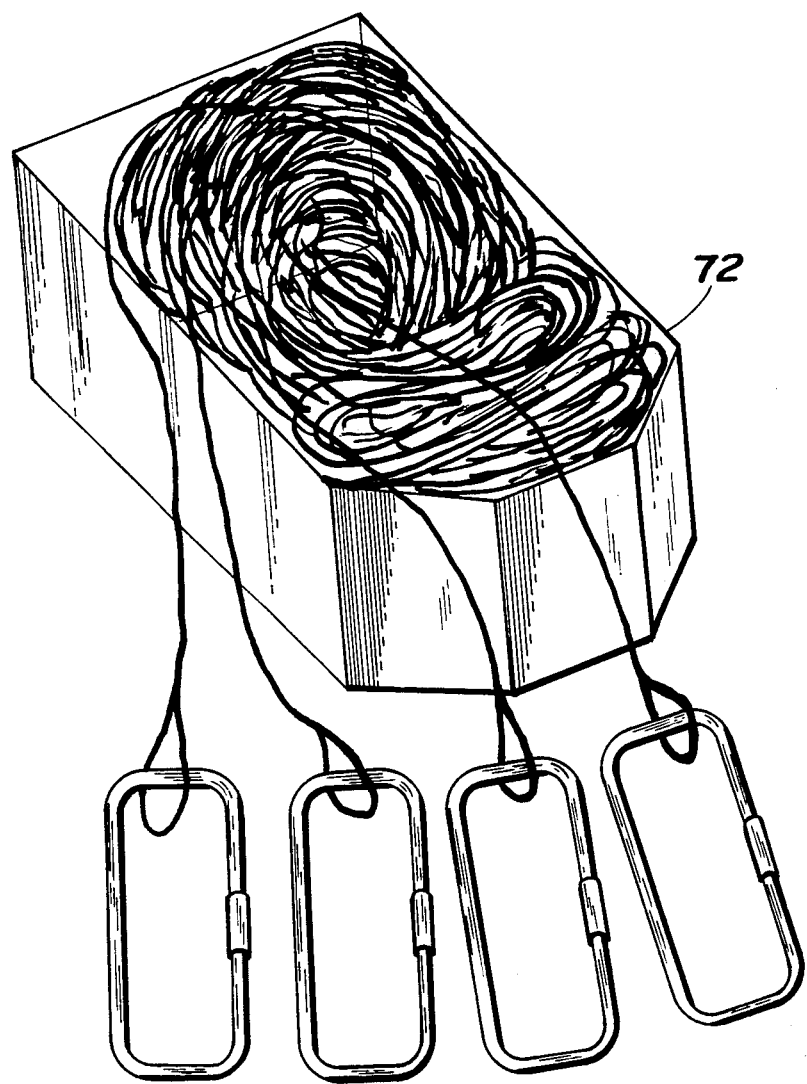
FIG. 5 is an isometric view of the cargo line bin of the invention.

The cargo line bin is a plastic rope container conforming in shape with the cargo line housing to fit efficiently with the housing, but to fall freely therefrom. Desirably the cargo line bin is made of a disposable plastic vacuum forming or similarly molded using a thermoplastic resin. The purpose of the cargo line bin is to contain the ropes, repelling hooks, the carabiner, and safety snap hooks for ease in loading them into the cargo retrieving line housing. Although the cargo line bin 72 is considered to be expendable it is strong enough to be refused if desired. It is, however, jettisoned with the cargo retrieving lines. Generally the lines are rolled into cargo line bin 72 as shown in FIG. 5, which can then be readily inserted through the doors of the cargo line housing 6 with its base against doors 18. Referring now to the operation of the cargo line jettisoned apparatus of the invention cargo line bin 72 is packed with cargo retrieving lines 14 as described and inserted into housing 6. It will be held in place until one of the spring biased doors 18 is pushed closed when this door is held while the latching door, carrying the latch bar mechanism 40, is snapped and held closed by latch 32. During normal operations, doors 18 are retained in their closed position by latches 32, interconnected to the single bell crank 60 mounted on the side of housing 6. Bell crank 60 is connected to an emergency manual release cable 40 by a quick connect fastener. Actuation of the release cable by the pilot will rotate bell crank arm 62 to the open position. This action of the bell crank arm pulls cable release lines 44 attached to their respective end fittings, thereby releasing the hold on latch 32 on its U-bolt 40. It must be realized that due to the spring loading crank arm 62 will normally be about perpendicular to the position shown in FIG. 3. Springs 36 reposition the bell crank arm to this position. With the release of latches 32, doors 18, biased to spring open, do so, and the cargo line bin containing the cargo retrieving lines is jettisoned from housing 6. The cargo line bin eliminates having to stuff the lines in an overhead housing or box with a door in its bottom, and the carabiner holds the cargo retrieving lines together so that they can be quickly reached after they are jettisoned from the housing during deployment. The carabiner also is necessary to prevent line entanglement during deployment.

It will be appreciated that the various elements of this invention can be modified in appearance and in materials employed. Thus a wide variety of materiels are available for the fabrication of the cargo retrieving line apparatus, such as plastics, steel, aluminium and the like. Even though standard repelling hooks (19) have been mentioned, it is understood that safety snap hooks (FIG. 5) as well as standard repelling hooks can be used on the bottom ends of the cargo retrieving lines (14). In addition the various latches, spring biasing means, and cable release means are available. Such ramifications and variations are deemed to be within the scope of this invention.

What is claimed is:

1. In a helicopter of the type having a cargo retrieving line carried by means attached to the underside thereof, adapted to be lowered therefrom to retrieve cargo, the cargo retrieving line being provided with a repelling hook at its lowering end for attachment to cargo, the improvement permitting rapid deployment of a plurality of such cargo retrieving lines comprising a cargo line housing in the form of a box secured at its top to the helicopter at its cargo hook attachment point, door means in the cargo line housing including a spring biasing means and a door in the bottom of the housing, the door being biased to an open position, latch means adapted to hold the door closed against said bias, a cargo retrieving line bracket within said cargo line housing, attached to the helicopter, means secured one end of the cargo retrieving lines to the bracket, and cable release means opening the cargo line housing door to jettison the cargo retrieving lines.

2. The cargo line housing of claim 1 in combination with a cargo line bin conforming in shape with the cargo line housing permitting the bin when loaded with retrieving lines to be inserted through the cargo line housing door while carrying the cargo retrieving lines, and a spring carabiner passing thru the cargo hooks to hold the cargo retieving line together after the jettisoning thereof for rapid deployment.

3. The combination of claim 2 wherein the cargo line housing is fabricated of aluminum and the cargo line bin is a disposable plastic.

4. The combination of claim 2 wherein the means securing the cargo retrieving lines to the bracket are safety snap hooks and the cargo hooks are repelling hooks.

* * * * *